United States Patent [19]
Landsman

[11] 3,945,318
[45] Mar. 23, 1976

[54] PRINTING PLATE BLANK AND IMAGE SHEET BY LASER TRANSFER

[75] Inventor: Robert M. Landsman, Norwalk, Conn.

[73] Assignee: LogEtronics, Inc., Springfield, Va.

[22] Filed: Apr. 8, 1974

[21] Appl. No.: 459,039

[52] U.S. Cl............. 101/467; 101/401.1; 346/76 L; 427/53
[51] Int. Cl.$^2$.. B41C 1/06; B41C 1/10; G01D 15/14
[58] Field of Search................ 101/401.1, 467, 471; 346/76 L; 427/53

[56] References Cited

UNITED STATES PATENTS

| | | | |
|---|---|---|---|
| 1,117,490 | 11/1914 | Horney | 101/467 |
| 1,482,356 | 1/1924 | Dausmann | 101/181 |
| 3,010,390 | 11/1961 | Boskes | 101/467 X |
| 3,554,125 | 1/1971 | VanDorn | 101/467 X |
| 3,592,644 | 7/1971 | Vrancken | 117/36.1 X |
| 3,619,157 | 11/1971 | Brinckman | 101/463 X |
| 3,745,586 | 7/1973 | Braudy | 101/471 X |
| 3,787,210 | 1/1974 | Roberts | 346/76 L |
| 3,793,025 | 2/1974 | Vrancken et al. | 101/464 X |

*Primary Examiner*—Clyde I. Coughenour
*Attorney, Agent, or Firm*—William D. Hall

[57] ABSTRACT

This is a lithographic printing plate blank adapted to be processed by applying a beam of laser radiation through a radiation transparent sheet to transfer selected portions of a combustible coating material on the sheet onto a lithographic surface; the lithographic surface provides a hydrophilic background on which oleophilic printing areas are provided by the transferred material. In the composite blank the coated sheet is held electrostatically in intimate contact with the lithographic surface, which is a grained surface, so that the coated surface and lithographic surface are maintained in intimate contact in spite of the generation of gases therebetween due to the laser initiated combustion which would ordinarily tend to separate the surfaces and reduce resolution. The coated sheet is provided with an electrostatic charge during manufacture of the composite sheet, either by manually inducing the charge or by building the charge into the sheet to make it an electret.

13 Claims, 3 Drawing Figures

Fig. 1.
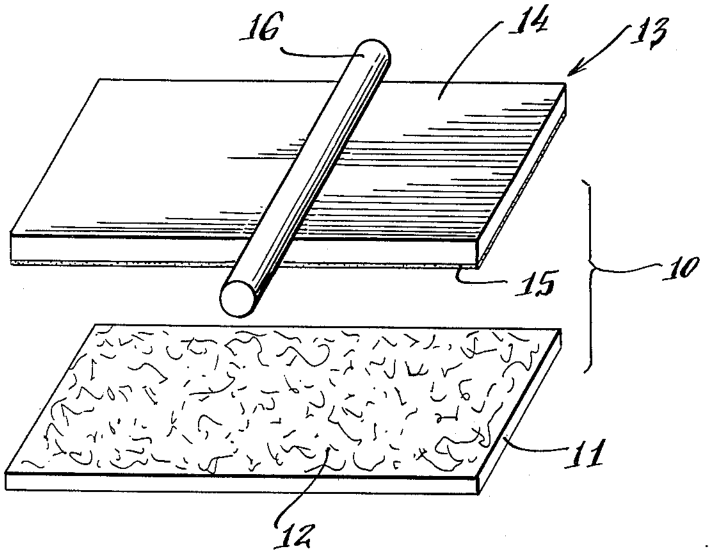
Fig. 2.
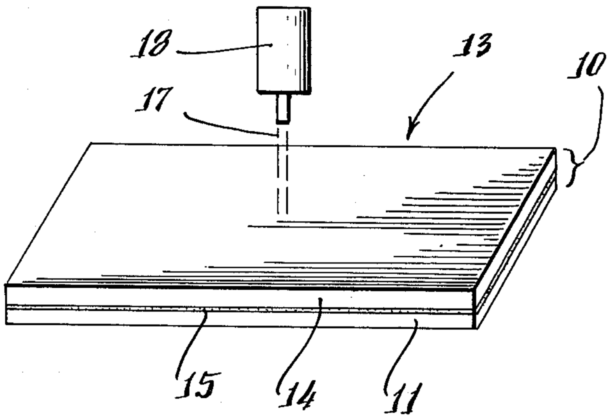
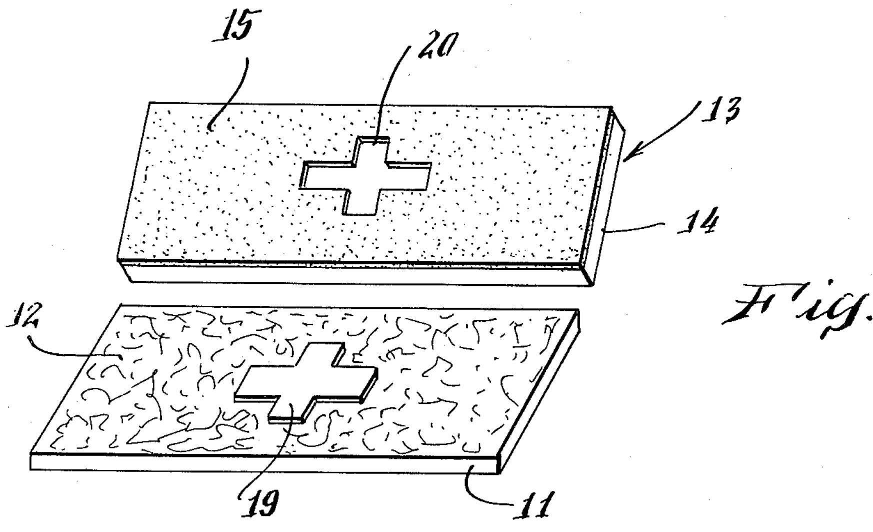
Fig. 3.

PRINTING PLATE BLANK AND IMAGE SHEET BY LASER TRANSFER

BACKGROUND OF THE INVENTION

This invention relates generally to lithographic printing plate blanks and particularly to a type of lithographic printing plate blank which consists of a radiation transparent transfer sheet, coated on one side with a oleophilic material, and a receptor sheet having a lithographic hydrophilic surface, and in which a laser is applied through the transfer sheet to cause coating material on the transfer sheet to blow off onto the lithographic surface of the receptor sheet in a selected image pattern. The plate blank thus processed is thereafter inked and used for printing in a conventional manner.

For this laser processing the lithographic surface of the receptor sheet is placed in at least close proximity to coated surface of the transfer sheet; the laser beam is scanned over the uncoated side of the radiation transparent transfer sheet and is modulated for causing blow off of the coating in a selected pattern. Suitable laser scanning apparatus for this purpose is illustrated by U.S. Pat. No. 3,816,659 for Scanning Apparatus issued June 11, 1974, in the name of the present inventor.

It is known to transfer an ink like substance from one surface to another using laser radiation applied through a radiation transparent sheet to cause selected portions of the ink like material coated on the sheet to blow off onto an adjacent receptor sheet. Such a technique is decribed in U.S. Pat. No. 3,745,586, July 10, 1973 in the name of R. S. Braudy which relates to non-impact writing and in which the image thus produced is the final printed image desired. It is also previously known to use a lithographic surface as the receptor surface and to have the material transferred thereto by laser irradiation of an oleophilic or ink receptive material so that the resultant plate is a lithographic printing plate which is thereafter inked and applied to reproduce multiple printed copies in a conventional manner.

In the prior art, as illustrated by the aforementioned U.S. Pat. No. 3,745,586, it has been felt necessary to space the receptor sheet from the transfer sheet for the transfer step in order to provide an exit space for the gases generated by the combustion which accomplishes the transfer. If the gaseous combustion products do not disperse or do not disperse fast enough, they force the sheets apart or otherwise affect the transfer of coating material so that the resolution of the transfer image is non-uniform or totally degraded. However, it has been demonstrated in the art that a suitably well defined image can be formed with the transfer and receptor sheets in intimate contact for the transfer step if: (1) the surface of the receptor sheet is grained or otherwise slightly roughened so as to provide passages for the gaseous combustion products to disperse from between the sheets and (2) the critical surfaces of the transfer and receptor sheets (ie. the surface areas at which the transfer occurs) are maintained uniformly in contact. If the sheets are not kept in uniform contact, if gas buildup causes the sheets to bulge apart in a localized area, the resolution of the transfer image will be distored at that point. Since the uncoated surface of the transfer sheet must be exposed to the beam of laser radiation which initiates the combustion transfer, it is a problem to find suitable means for holding the sheets together. The transfer and receptor sheets may be stored separately and assembled into a composite plate on the laser scanning apparatus, for example by making the transfer sheet larger than the receptor sheet and using a vacuum holddown, but for commercial and practical purposes it is more desirable to have the two sheets assembled and held together as a composite blank during manufacture. This would simplify packaging, handling and storing and would mean that the person processing the blank would not have to assemble separate sheets, but would simply mount a single composite blank on the laser scanning apparatus.

SUMMARY OF THE INVENTION

It is a principal object of this invention to provide composite printing plate blanks, consisting of transfer sheets and receptor sheets, of the type described above, in which the transfer and receptor sheet in each assembled composite blank remains held in intimate contact with sufficient force that they remain so during shipment, storage and mounting on the laser processing apparatus for processing into a finished planographic plate.

A further object is to provide a composite printing plate blank of the subject type in which the transfer and receptor sheets remain in uniform and intimate contact during processing despite the presence of gaseous combustion products produced between the sheets by the processing, but in which the two sheets are easily pulled apart after the laser processing is completed.

The foregoing objects are realized by a composite printing plate blank in accordance with this invention, in which the receptor sheet has a lithographic surface that is grained or roughened and in which the transfer and receptor sheets are held in intimate contact electrostatically.

In accordance with the invention, at least one of the sheets, or a surface thereof, is a material which holds an electrostatic charge and the other sheet, or a surface reacts electrostatically. In the usual case the radiation transparent sheet is the material which holds the electrostatic charge, either by being a material such as a polyester which may be electrostatically charged by mechanical rubbing or scuffing or by being made an electret, by applying a polarizing electric field across the sheet or across the coating thereon during manufacture of the sheet itself or during the application of the coating thereon. The composite plate blank is then assembled. In the usual commercial practice of the invention the receptor sheet will be a sheet of aluminum, which has a grained or roughened lithographic surface. The transfer sheet is suitably a thin (3 mil, for example) sheet of Mylar polyester having one side coated with carbon black particles in a self-oxidizing binder, such as nitrocellulose. The polyester sheet is electrostatically charged as by rubbing or by placing it in a polarizing electric field while it is being formed or while it is being coated. The coated polyester transfer sheet being an insulator retains the charge so that the two sheets are held together electrostatically when one is placed on the other to form the composite plate blank of the invention.

It will be appreciated, that the specific materials used for the transfer and receptor sheets and the selection of the one which is electrostatically charged and the one which is relatively electrostatically conductive is not critical to the invention. It is only essential that one of the two sheets be electrostatically charged so that the two are held together electrostatically when placed in intimate contact.

DESCRIPTION OF THE DRAWINGS

The invention is described in more detail below with respect to an illustrative embodiment shown in the accompanying drawings in which:

FIG. 1 is a perspective view of a coated transfer sheet and a receptor sheet preparatory to being placed together in intimate contact to form a composite lithographic printing plate blank of this invention.

FIG. 2 is a perspective view illustrating the manner in which a composite printing plate blank of this invention is processed by a laser for transferring portions of the coating material from the transfer onto the lithographic surface of the receptor sheet in a selected pattern defining the image to be reproduced by printing, and FIG. 3 is a perspective view showing the transfer sheet pulled apart from the receptor sheet after the laser processing step illustrated in FIG. 2.

DETAILED DESCRIPTION OF THE INVENTION

Referring to FIGS. 1 and 2, a lithographic printing plate blank 10 in accordance with the invention consists essentially of a receptor sheet 11, having, a grained or roughened lithographic surface 12, and a transfer sheet 13, which is a radiation transparent sheet 14, such as Mylar polyester, having on one side a coating 15 of a mixture of a radiation absorbent material, an oleophilic material and a self-oxidizing binder. FIG. 1 shows the receptor sheet 11 and transfer sheet 13 separated, preparatory to being brought together to form the composite plate blank 10 of this invention in which, as illustrated in FIG. 2, the coating 15 of the transfer sheet 13 is in intimate contact with the lithographic surface 12 of the receptor sheet 11.

In the composite blank 10 the transfer sheet 13 and the receptor sheet 11 are held together by electrostatic attraction, one of them being a material which holds an electrostatic charge and the other being a material which reacts electrostatically. In accordance with present and expected practice of the invention the receptor sheet 11 can be either electrostatically conductive or nonconductive relative to the transfer sheet 13 and the transfer sheet 13 is electrostatically charged.

In the preferred form of the invention the receptor sheet 11 is a sheet of aluminum, such as a 4 mil sheet of aluminum foil, having a grained surface 12 which is the lithographic, hydrophilic, surface. As used herein grained means that the surface 12 is slightly roughened so as to have a multiplicity of minute interconnecting troughs which provide passages for gaseous combustion products of the self-oxidizing binder of the coating 15 to disperse between the transfer and receptor sheets, 13 and 11, when the composite blank 10 is laser processed, as in the manner described in more detail below with reference to FIGS. 2 and 3. The surface 12 of the receptor sheet 11 may be grained or roughened in any suitable manner, such as by being sandblasted, acid etched or by passing it under a rough surfaced roller against which the surface of the sheet is pressed during manufacture.

The radiation transparent sheet 14 of the transfer sheet is a material which holds an electrostatic charge; Mylar polyester is a particularly suitable material, but other materials, such as polycarbonates and nylon, could also be used.

The coating 15 on the sheet 14 of the transfer sheet 13 must include: a self-oxidizing binder, such as nitrocellulose, a material which will absorb the laser radiation applied for initiating combustion of the self-oxidizing binder, and an oleophilic material. Carbon black is a particularly good material for the coating since it performs both the latter two functions; specifically, it absorbs a wide range of laser radiation and is also oleophilic. A suitable formulation for the coating 15 would include approximately equal parts by weight of carbon black and nitrocellulose.

In one form of the invention the transparent sheet 14 of the coated transfer sheet 13 is a material, such as Mylar polyester, a polycarbonate or nylon, which can be electrostatically charged mechanically by rubbing or scuffing it, for example, by passing the coated sheet 13 under a scuffing roller 16 as illustrated in FIG. 1, or by other suitable means, such as by passing the coated sheet 13 through an interdigitated electric field.

An electrostatic charge placed on the sheet 13 mechanically in the aforementioned manner has the drawback that it dissipates in time and would probably be unreliable for holding the sheets together so that they could be relied upon to hold firmly together for laser processing after a long period (eg. a year or more) in storage, for example. In a preferred form the sheet 13 is given a longer lasting electrostatic charge by making it an electret. This may be done by passing the transparent sheet 14 through a polarizing electric field when the sheet is being formed, as when the sheet material emerges from the sheet forming die of an extruder. Alternatively, a polarizing electric field could be applied to the coating 15 at the time liquid or viscous coating material is spread onto the sheet 14 by a conventional coating process.

When the transfer sheet 13 has an electrostatic charge on it the composite plate blank 10 is assembled by placing the transfer sheet 13 on the receptor sheet 11 with the coating 15 in intimate contact with the grained lithographic surface 12.

The manner of processing a plate blank 10 of this invention for producing an imaged lithographic printing plate is illustrated in FIGS. 2 and 3. The composite printing plate blank 10 is mounted on laser scanning apparatus as illustrated in the aforementioned U.S. Pat. No. 3,816,659 and a beam 17 of radiation from a laser indicated at 18 is applied in a raster pattern to the outward uncoated surface of the radiation transparent sheet 14 of the transfer sheet 13.

The laser beam 17 passes through the radiation transparent sheet 14 to the coating 15 where it is absorbed by the carbon black particles thereon (or by other radiation absorbent material used alternatively for this purpose) and initiates combustion of the self-oxidizing binder in the coating. Combustion of the binder causes it to blow a portion of the coating 15, including the oleophilic material therein, onto the lithographic surface 12 of the receptor sheet 11 where it adheres. As previously mentioned the gaseous combustion products escape from between the transfer and register sheets, 13 and 11, through the passages provided by the grained nature of the surface 12. As already noted, carbon black in the coating 15 serves the dual function of being the radiation absorbent material as well as the oleophilic material; the carbon black might, of course, be supplemented or replaced by other materials for either or both these functions.

The beam of laser radiation that is applied is normally radiation in the infrared region; and suitable lasers are YAG (yttrium-aluminum-garnet) lasers which have an effective wavelength on the order of 1.06 micrometers or argon lasers which have an effective wavelength on the order of about 0.5 micrometers, for example. As the laser beam 17 scans the surface of the transfer sheet 13 of the plate blank 10 it is modulated in accordance with signals representing the material to be imaged on the lithographic surface 12. Apparatus adapted for performing this function is described in U.S. Pat. No. 3,739,088.

After a desired image pattern has been formed on the lithographic surface 12 of the receptor sheet 11 by the laser processing, the transfer sheet 13 is readily stripped from the receptor sheet 11; since the sheets are held together by electrostatic attraction and since there is no mechanical adhesion, the sheets are easily separated without damage to either surface.

FIG. 3 illustrates the separated parts of the laser processed printing plate. An image pattern of oleophilic material transferred from the coating 15 and adhered to the lithographic surface 12 is illustrated at 19. This transfer leaves a correspondingly patterned clear area 20 on the transfer sheet 13 from which the coating material 15 has been removed. The receptor sheet 11 with the oleophilic image 19 thereon is thus a positive printing plate, which when inked is used to produce printed copies in the conventional manner, and the transfer sheet 13, having clear image area 20, is thus a negative which is useful in the production of proof copies or for imaging conventional photolithographic printing plates, for example.

What is claimed is:

1. A printing plate blank comprising a hydrophilic receptor sheet of material having a grained surface, and a transfer sheet of material that is transparent to a beam of laser radiation of a particular wavelength range and having on one side thereof a coating consisting essentially of a combustible mixture of a material which absorbs said laser radiation, and a self-oxidizing binder, said grained surface including a multiplicity of raised areas separated by troughs which will receive any gases generated during further processing of the blank, said transfer sheet comprising electrostatic means holding said sheets in intimate contact thereby positioning said transfer sheet in contact with said raised areas and bridging said troughs so that said transfer sheet does not prevent dispersion of gases to the troughs, and said coating comprising means which, in response to application of said beam of laser radiation to a portion of said coated sheet in contact with said surface area, effects combustion of said coating at said portion and also effects a change in the character of the receptor sheet surface that is in contact with said portion of said coated side of said transfer sheet, so that in response to selective application of said laser beam to said coated sheet the receptor sheet will have transferred to it, and adhered to it, oleophilic surface areas while leaving the receptor sheet with other hydrophilic areas so that said receptor sheet thereby is capable, upon removal of said transfer sheet, of functioning as a printing plate.

2. The printing plate blank of claim 1 in which said radiation transparent transfer sheet is a material from the group consisting of polycarbonates, polyesters, and nylon.

3. The printing plate blank of claim 1 in which said coating material which absorbs said laser radiation is carbon and in which said grained surface of the receptor sheet is essentially aluminum.

4. The printing plate of claim 1 in which at least one of the radiation transparent sheet and the coating of the transfer sheet is an electret.

5. The method of making a printing plate from a receptor sheet of a type having a hydrophilic surface comprising:

providing small cavities in one surface of the receptor sheet to relieve high pressure effects resulting from the generation of gases;

providing a transfer sheet transparent to a laser beam;

coating one face of the transfer sheet with a substance which in response to laser beam radiation passing through said transfer sheet emits gases and produces a material capable of adhering to said receptor sheet;

applying the coated face of the transfer sheet to said one surface of the receptor sheet;

applying an electrostatic charge to one of said sheets to effect adherence of the sheets;

selectively applying a laser beam through said transfer sheet to said substance to thus produce gases and said material and cause said material to adhere to the receptor sheet to provide said receptor sheet with a printing configuration, the gases dispersing into said cavities; and removing the transfer sheet thereby rendering said receptor sheet a printing plate.

6. A method of making a printing plate by applying a beam of laser radiation for transferring a selected pattern of oleophilic material from a transfer sheet onto a receptor sheet in the form of a lithographic plate, said method comprising:

forming a transfer sheet by coating one side of a sheet of material that is transparent to said beam of laser radiation with a coating consisting of an oleophilic material, a material which absorbs said laser radiation and a self-oxidizing binder such that combustion of the self-oxidizing binder is initiated by said laser radiation absorbed by said absorbent material;

providing a receptor sheet having a lithographic printing surface that is grained;

selecting said transparent sheet and the coating material thereon and said plate so that one will hold an electrostatic charge and the other is electrically conductive;

placing an electrostatic charge on at least one of said sheets;

placing the transfer sheet with its coated side in intimate contact with the grained lithographic surface of the receptor sheet whereby the two sheets are held electrostatically together in said intimate contact; and directing a laser beam on the coated side of said transfer sheet in accordance with a configuration of the subject matter to be printed to effect said combustion and for applying the solid products of said combustion onto the receptor sheet to provide a printing surface thereon.

7. The method of claim 6 in which said radiation transparent sheet of said transfer sheet is a material from the group consisting of polycarbonates, polyesters and nylon and in which an electrostatic charge is placed on the transfer sheet by scuffing the uncoated surface of the radiation transparent sheet thereof.

8. The method of claim 6 in which said electrostatic charge is placed on said one of said sheets by making at least a portion of said one sheet an electret.

9. The method of claim 8 in which an electrostatic charge is placed on the transfer sheet by making the radiation transparent sheet thereof an electret.

10. The method of claim 8 in which an electrostatic charge is placed on the transfer sheet by making the coating thereof an electret.

11. A printing plate blank comprising receptor sheet means having a multiplicity of raised areas separated by troughs which will provide relief from excessive gas pressure generated therein during further processing of the blank, a transfer sheet, said transfer sheet comprising electrostatic means holding said transfer sheet to said multiplicity of raised areas while bridging said troughs so that the transfer sheet does not preclude the dispersion of gases to said troughs, said transfer sheet comprising means which, in response to predetermined irradiation, releases gases between the first named means and the transfer sheet and also forms a printing plate by changing the character of the surface area of said first named means that is in contact with the portion of the transfer sheet which received the predetermined irradiation, whereby in response to selective application of said predetermined irradiation certain portions of the surface area of the first named means are changed in character to thereby form a printing plate.

12. The method of making a printing plate from a receptor sheet of a type having a hydrophilic surface comprising providing small cavities in one surface of the receptor sheet to relieve high pressure effects resulting from the generation of combustion gases, providing a transfer sheet transparent to a laser beam, coating one face of the transfer sheet with a mixture of carbon and a self-oxidizing binder which is sufficiently absorbed by the carbon to effect combustion of the mixture in response to laser beam radiation passing through said transfer sheet and impinging on said mixture, applying the coated face of the transfer sheet to said one surface of the receptor sheet, applying an electrostatic charge to one of said sheets to effect adherence of the sheets, selectively applying a laser beam through said transfer sheet to said mixture effecting combustion thereof and adhering combustion products to the receptor sheet to provide it with a printing configuration, the combustion gases dispersing into said cavities, and removing the transfer sheet thereby rendering said receptor sheet a printing plate.

13. The method of claim 12 in which the wavelength of the laser beam is in the range of about 0.4 to about 1.1 micrometers.

* * * * *